March 23, 1965  S. FISHER  3,175,071
ROLLER-ELECTRODE WELDER
Filed July 30, 1962
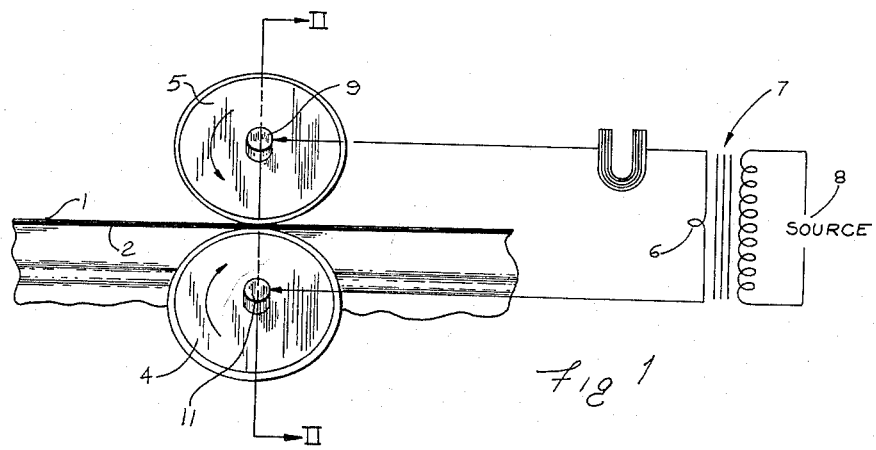
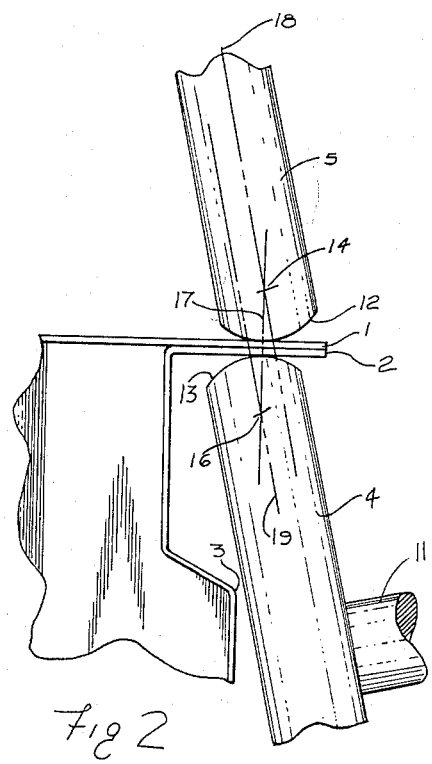
INVENTOR.
SIMON FISHER
BY
*Woodhams Blanchard and Flyer*
ATTORNEYS

United States Patent Office 3,175,071
Patented Mar. 23, 1965

3,175,071
ROLLER-ELECTRODE WELDER
Simon Fisher, Bay City, Mich., assignor to National Electric Welding Machines Co., Bay City, Mich., a corporation of Michigan
Filed July 30, 1962, Ser. No. 213,516
3 Claims. (Cl. 219—81)

This invention relates to resistance-type welding machines and particularly to an electrode arrangement for a seam welder.

In the design of seam welders there have in the past been suggested many different arrangements of rolling electrodes for use with work of different shapes. However, in the welding of superposed portions of workpieces which portions define a flange which is spaced only a short distance above other parts of a workpiece, such as a bulge or shoulder thereon, there are presented problems which have not, insofar as I am aware, been satisfactorily solved previously. More specifically, the prior art has attempted to deal with this problem in a variety of different ways but all of them, insofar as I am aware, have utilized a pair of rolling electrodes, each thereof having a contact surface of appreciable breadth. However, in view of the projecting part of the workpiece below the flange, such as the bulge or shoulder above mentioned, it is essential that the lower electrode be angled outwardly to clear such projecting part. This then requires exacting control of the electrodes to prevent slippage thereof with respect to the flange and to maintain the electrodes opposite each other so that the welding pressure is properly applied and so that the welding current flows properly. In other instances, the flange itself has been bent at or prior to the time of welding to enable the rolling electrodes to bear perpendicularly thereagainst. This makes it possible to achieve a satisfactory welding operation but necessitates subsequent rebending of the flange into the desired position. Another arrangement contemplates the use of the electrodes having somewhat rounded edges in which the electrodes are in line with each other but the electrodes contact the work at points laterally offset with respect to each other. This lengthens the distance that the welding current must travel through the work, also causing offset welding pressure conditions, and all of this diminishes the efficiency of the welding operation.

Accordingly, the objects of the invention include:

(1) To provide an improved welding electrode arrangement for a resistance seam welder which arrangement is useful for welding workpieces which have a projecting part located above or below the zone to be welded at a distance less than the diameter of the adjacent electrode.

(2) To provide an improved welding electrode arrangement for seam welding, as aforesaid, in which one electrode may be angled with respect to the workpiece to clear the projecting part thereof and yet the electrodes will be free from any appreciable tendency to slip either with respect to each other or with respect to the work.

(3) To provide an improved welding electrode arrangement, as aforesaid, in which the path of welding current flow will be of a minimum length.

(4) To provide an improved welding electrode arrangement for meeting the conditions as, aforesaid, in which the welding pressure is at right angles to the welding wheel face.

(5) To provide an improved welding electrode arrangement, as aforesaid, which will not be appreciably, if any, more expensive to manufacture and service than other electrode arrangements previously known for this same general purpose.

(6) To provide an improved welding electrode arrangement, as aforesaid, which is equally applicable to the welding of conventional overlapped workpieces wherein the problem of interference from closely adjacent projecting parts of the workpieces is not present.

(7) To provide an improved welding electrode arrangement, as aforesaid, which is applicable to a variety of different types and kinds of workpieces.

Other objects and purposes of the invention will be apparent to persons acquainted with apparatus of this general type upon reading the following description and inspecting the accompanying drawings.

In the drawings:

FIGURE 1 is a schematic view of a pair of rolling-welding electrodes together with a workpiece of the type giving rise to the problem met by the present invention.

FIGURE 2 is a sectional view taken on the line II—II of FIGURE 1.

It has been found that the above-mentioned problems can be solved satisfactorily by providing a pair of roller-type welding electrodes whose peripheral edges are rounded in an axial as well as a circumferential direction. Thus, the peripheral edge of each electrode is radiused about a center which is radially offset from and in a direction perpendicular to the axis of rotation of each respective one of the roller electrodes. The roller electrodes are both positioned so that their axes of rotation are substantially parallel with each other and are inclined with respect to the plane of the work being welded. Further, the roller electrodes are arranged so that an imaginary line connecting the centers on which said edges are radiused is perpendicular to the work being welded and to each electrode.

Referring to the drawings, there are shown workpieces having a pair of flanges 1 and 2 which are to be welded together. The flange 2 is associated with an interference 3, herein an enlargement on one workpiece, which extends outwardly to a point substantially below the flange 2 but spaced therefrom a distance appreciably less than the diameter of the roller electrode to be used for welding same.

For welding the flanges 1 and 2 together, there is provided a pair of seam-welding roller electrodes 4 and 5 which are connected in any convenient manner to the opposite terminals of the secondary winding 6 of a welding transformer 7. Said welding transformer is supplied in any convenient and conventional manner from a source 8 of electrical energy. Said electrodes are driven in any conventional manner by the shafts 9 and 11 connected thereto in directions indicated by the arrows in FIGURE 1 so as to cause them to travel along the overlapped flanges 1 and 2 or to drive said flanges through and past said electrodes.

The peripheral surfaces 12 and 13 of said rolling electrodes are radiused, said radiusing being about the centers 14 and 16, respectively. Here the centers 14 and 16 are located substantially midway between the axial faces of their respective electrodes and are located closer to the periphery of the electrodes than to the axis of rotation of each thereof. In the illustrated embodiment, said centers 14 and 16, which actually constitute circles of diameter less than the diameter of the electrodes, are spaced from the peripheral surfaces of the electrodes a distance about equal to the axial thickness of the electrodes. However, this is only an example illustrating a preferred embodiment of the invention and at least the broader purposes of the invention can be obtained even if the position of the centers 14 and 16 is varied somewhat from the location above indicated and illustrated in FIGURE 2.

The electrodes 4 and 5 are positioned so that their axes of rotation are substantially parallel with respect to each other and are inclined with respect to the flanges 1 and 2. Further, the electrodes are arranged so that an imaginary line 17 drawn between the points 14 and 16 is perpendicular to the mutually contacting surfaces of the flanges 1 and 2. In this particular embodiment of the invention where the centers 14 and 16 are midway between the axial faces of the electrodes, the lower electrode 4 is offset inwardly with respect to the electrode 5.

In this manner, since the flanges 1 and 2 are parallel with respect to each other and are tangent, respectively, to the curved surfaces 12 and 13, lines perpendicular to said flanges and drawn through their respective points of tangency with the electrodes 4 and 5, respectively, will be coincident and will pass through the centers 14 and 16.

Thus, the application of welding pressure by the electrodes 4 and 5 to the flanges 1 and 2 will be perpendicular to said flange, and, in addition, the points of contact of said electrodes against said flanges will be at two points on a single straight line so that the current flow between said electrodes will follow a path of minimum length. This will facilitate both a rapid and an effective weld. Further, movement of the electrodes 4 and 5 to compensate for wear thereof will be in the direction of the lines 18 and 19 which are parallel. This simplifies the support structure for the electrodes and minimizes the possibility of the occurrence of electrode slippage with respect to the work.

The precise spacing of the points 14 and 16 from the edges of the electrodes may be varied somewhat within the scope of the invention, provided only that the amount of curvature of the surfaces 12 and 13 is such that the contact zone between said electrodes and the work is relatively small. However, the axes of rotation of the electrodes must be inclined with respect to the contacting surfaces to be welded and the location of said electrodes with respect to each other must be such that the line 17 connected with points 14 and 16 will be perpendicular to the contacting surfaces to be welded.

Although a particular preferred embodiment of the invention has been described above in detail for illustrative purposes, it will be recognized that variations or modifications of such disclosure, which lie within the scope of the appended claims, are fully contemplated.

What is claimed is:
1. A rolling electrode arrangement for the seam welding of a pair of superposed sheets, particularly sheets having an interference spaced from one of said sheets a distance less than the diameter of said electrodes, comprising the combination:
   a pair of roller electrodes, each having its peripheral surface curved in an axial direction about a center comprising a circle coaxial with said electrode and of lesser radius than said electrode, but said circle being located sufficiently close to said peripheral surface that only a relatively narrow contact zone will exist between said electrode and said sheets; and
   means mounting said electrodes with their axes of rotation being substantially parallel and inclined with respect to said sheets, said center on one electrode being offset in an axial direction with respect to said center on the other electrode, the mutually closest points of the peripheral surfaces of said electrodes being substantially opposite each other and respectively on opposite axial sides of their said centers.

2. A rolling electrode arrangement as defined in claim 1 wherein the center on which each of said peripheral surfaces of said electrodes is curved is located radially inwardly from said peripheral surface a distance approximately equal to the axial thickness of said electrode.

3. A rolling electrode arrangement as defined in claim 1 where in the electrodes are arranged so that an imaginary straight line connecting said centers passes perpendicularly through said sheets.

References Cited in the file of this patent
UNITED STATES PATENTS

| | | |
|---|---|---|
| 1,637,031 | Tobey | July 26, 1927 |
| 1,900,941 | Kuhlman | Mar. 14, 1933 |

FOREIGN PATENTS

| | | |
|---|---|---|
| 191,225 | Austria | Aug. 10, 1957 |